United States Patent [19]

Shearing

[11] 3,772,051

[45] Nov. 13, 1973

[54] DECORATIVE FLOORING SURFACES

[75] Inventor: Herbert Jackson Shearing, Manchester, England

[73] Assignee: Imperial Chemical Industries Limited, London, England

[22] Filed: July 29, 1971

[21] Appl. No.: 167,443

[52] U.S. Cl............... 117/9, 106/90, 106/94, 117/26, 117/64 R, 117/161 KP
[51] Int. Cl.............. B44c 1/06, B44d 1/44
[58] Field of Search........... 117/25, 161 KP, 64 R, 117/62, 8, 9, 168, 26; 106/90, 94

[56] References Cited
UNITED STATES PATENTS

| 2,491,487 | 12/1949 | Faulwetter | 106/90 |
|---|---|---|---|
| 2,902,388 | 9/1959 | Szukiewiez | 106/90 |
| 3,155,529 | 11/1964 | Paturzo | 117/8 |
| 3,097,080 | 7/1963 | Weir | 117/64 R |
| 3,240,736 | 3/1966 | Beckwith | 106/90 |
| 3,666,696 | 6/1972 | Moore | 106/90 |
| 2,817,619 | 12/1957 | Bickel et al. | 117/64 R |

FOREIGN PATENTS OR APPLICATIONS

| 2,008,417 | 1/1970 | France | 106/90 |
|---|---|---|---|
| 1,192,864 | 5/1970 | Great Britain | 106/90 |
| 1,093,375 | 11/1967 | Great Britain | 117/8 |

Primary Examiner—William D. Martin
Assistant Examiner—William R. Trenor
Attorney—Cushman, Darby & Cushman

[57] ABSTRACT

A process for the manufacture of decorative flooring surfaces which comprises bonding fragments of material to the floor to be surfaced, filling in the gaps between the bonded fragments with a grouting composition containing as essential ingredients a hydraulic cement, a fine particle size filler, water and an organic polyisocyante allowing the grouting composition to harden and then grinding or otherwise treating the hardened mass to expose the fragments of material and provide a smooth surface.

9 Claims, No Drawings

DECORATIVE FLOORING SURFACES

This invention relates to flooring compositions, more particularly to a process for the manufacture of cement/urethane-based flooring compositions having a decorative effect, and is an improvement in or modification of the invention described in our copending application, Ser. No. 123,420 filed Mar. 11, 1971.

Application, Ser. No. 123,420 filed Mar. 11, 1971 describes a process for the manufacture of decorative flooring surfaces which comprises applying to the floor to be surfaced a composition having as essential ingredients a hydraulic cement, fragments of mass-pigmented plastic material, water and an organic polyisocyanate, allowing the said composition to harden and then grinding or otherwise treating the surface of the composition to expose the plastic fragments.

We have now found that a similar effect can be obtained by first bonding fragments of plastic or other material to the substrate, filling in between the bonded fragments with a cement/urethane urethane based grouting composition, and when the grouting composition has hardened, grinding the hardened mass to expose the fragments of material.

Thus according to the present invention there is provided a process for the manufacture of decorative flooring surfaces which comprises bonding fragments of material to the floor to be surfaced, filling in the gaps between the bonded fragments with a grouting composition containing as essential ingredients a hydraulic cement, a fine particle size filler, water and an organic polyisocyanate, allowing the grouting composition to harden and then grinding or otherwise treating the hardened mass to expose the fragments of material and provide a smooth surface.

The fragments of material which are bonded to the floor surface in the first stage of the process may be of stone, for example, marble, or they may be pieces or chips of plastic material, for example, thermoplastic or thermosetting polymers or copolymers among which are included nylon polymers, polyvinyl chloride, polyvinyl chloride/polyvinyl acetate copolymers, urea/formaldehyde polymers, phenol/formaldehyde polymers, melamine/formaldehyde polymers, acetal polymers and copolymers, acrylic polymers and copolymers, acrylonitrile/butadiene/styrene terpolymers, cellulose acetate, cellulose acetate butyrate, polycarbonates, polyethylene terephthalate, polystyrenes, polyurethanes, polyethylenes and polypropylenes.

In order to obtain the best effects in accordance with the present invention the fragments of material should preferably have substantial size in all three dimensions, that is, they should be in the form of lumps rather than as sheet, ribbon or foil although flake material having a minimum thickness of 1/16 inch may be used effectively.

The fragments of material may have a maximum dimension of up to 6 inches (15.24 cm) but it is preferred that the maximum dimension lies in the range of ½ inch (1.27 cm) to 3 inches (7.62cm).

The fragments of material may be bonded to the floor surface by means of any polymers, natural or synthetic; which have adhesive properties. As examples of suitable adhesives there may be mentioned water-soluble or water-dispersible polymers such as gelatine, casein, polyvinyl acetate, copolymers of vinyl acetate with other vinyl monomers, butadiene/acrylonitrile copolymers, chlorinated rubber and chlorinated butadiene. In addition to the above, solvent-based adhesives may be used, for example, epoxy and urethane resins, including the polyisocyanate/pitch compositions described in our U.K. Specification No. 1,093,375 and polyisocyanate/bitumen systems. There may also be used air drying resins such as normal air drying alkyds, epoxy esters and urethane alkyds and oils, and materials which dry by solvent evaporation only, for example, thermoplastic polymers including nitrocellulose and adhesive compositions containing bitumen and/or coal tar pitch. Solvent free systems may also be used as the adhesive, again including epoxy and urethane resins, bitumen and coal tar pitch.

When the fragments of material are applied to the floor which is to be surfaced, they may be scattered loose over the area, to which has previously been applied an adhesive composition as defined above, or the fragments may be applied by trowel, having first been mixed or coated with the adhesive composition, The grouting composition which is used to fill in the gaps between the fragments of material which have been bonded to the floor surface contains as essential ingredients a hydraulic cement, a fine particle size filler, water and an organic polyisocyanate.

The term "hydraulic cement" is used in its usual sense to denote the class of structural materials which are applied in admixture with water and thereafter harden or set as a result of physical or chemical changes which consume the water present. As well as Portland cement, it includes :

1. Rapid hardening cements, as characterised by those with high alumina contents.

2. Low-heat cements as characterised by high percentages of dicalcium silicate and tetracalcium alumino ferrite and low percentages of tricalcium silicate and tricalcium aluminate.

3. Sulphate resisting cements as characterised by unusually high percentages of tricalcium silicate and dicalcium silicate and unusually low percentages of tricalcium aluminate and tetracalcium alumino ferrite.

4. Portland blast-furnace cement as characterised by a mixture of portland cement clinker and granulated slag.

5. Masonry cements as characterised by mixtures of Portland cement and one or more of the following : hydrated lime, granulated slag, pulverised limestone, colloidal clay, diatomaceous earth or other finely divided forms of silica, calcium stearate and paraffin.

6. Natural cements as characterised by material obtained from deposits in the Lehigh Valley, USA.

7. Lime cements as characterized by oxide of calcium in its pure or impure forms and whether containing or not some argillaceous material.

8. Selenitic cement as characterised by the addition of 5–10 percent of plaster of Paris to lime.

9. Pozzolanic cement as characterised by the mixture of pozzolana, trass kieselguhr, pumice, tufa, santorin earth or granulated slag with lime mortar.

10. Calcium sulphate cements as characterised by those depending on the hydration of calcium sulphate and includes plaster of Paris, Keene's cement and Parian cement.

As organic polyisocyanates which may be used, there may be mentioned aromatic diisocyanates e.g. tolylene-2,4-diisocyanate, tolylene-2,6-diisocyanate and mixtures of these, diphenyl methane diisocyanate, aliphatic, araliphatic and cycloaliphatic diisocyanates, e.g. hexamethylene and 2,2,4- and 2,4,4-trimethylhexamethylene diisocyanates, dicyclohexylmethane diisocyanates, 3-isocyanatomethyl-3,5,5-trimethylcyclohexyl isocyanate and xylylene diisocyanate; uretedione or isocyanurate polymers of the above-mentioned isocyanates and isocyanate-ended polyurethanes obtained by reacting an excess of an organic diisocyanate with a polyfunctional isocyanate-reactive compound such as a glycol or higher polyhydric alcohol, amino alcohol or polyamine, or a hydroxyl-ended polyester, polyesteramide or polyether, or with water (whereby polyisocyanate biuretes are formed).

There may also be used the diphenylmethane diisocyanate-containing composition known as "crude MDI," which is obtained by phosgenating the crude di-amino diphenylmethane which is prepared by condensing formaldehyde and aniline in the presence of hydrochloric acid.

Although the polyisocyanate may be used in the absence of any other isocyanate-reactive compound except the water which is an essential ingredient of the grouting compositions used in the process of the invention, it is preferred to add also an isocyanate-reactive organic compound to the compositions, as shrinkage on setting of the compositions is thereby reduced. As examples of the isocyanate-reactive organic compounds which may be used there may be mentioned polyhydric alcohols, aminoalcohols, polyamines, hydroxyl-ended polyesters, polyesteramides and drying oil and non drying oil modified alkyd resins, but it is preferred to use a dihydric or trihydric polyether having an equivalent weight of from 100 to 1500 or the products obtained by high temperature reaction between caster oil and hard resins, defined as products which are obtained by heating castor oil with a resin which is a rosinate of a metal selected from Group IIa of the Periodic Table or a condensation product of rosin with i. at least one polyhydric alcohol or ii. at least one polyhydric alcohol and at least one optionally substituted phenol/formaldehyde resol resin.

or iii. at least one polyhydric alcohol and at least one $\alpha,\beta$-unsaturated dicarboxylic acid or the anhydride thereof. These reaction products of castor oil and hard resins are more fully described in our copending application, Ser. No. 45,563 filed June 11, 1970, now U.S. Pat. No. 3,666,696.

As examples of fine particle size fillers which may be used in the grouting compositions there may be mentioned power station fly ash, expanded clay, foamed slag, mica, chalk, talc, clays such as china clay, asbestive, micronised barytes, silica and powdered slate.

The grouting composition may also contain pigments, and the fragments of material which in the completed process are surrounded by the grouting compositon may be coloured, by using coloured stone or mass-pigmented plastic as the source of the fragments. By suitable choices of colours between the fragments and the grouting compositions, a great variety of pleasing effects may be obtained when the grinding stage is carried out.

Epoxidised oils, for example, octyl epoxy stearate, may also be incorporated into the grouting composition, and have the effect of delaying the setting time without adversely affecting the final properties.

Solvents may also be included in the grouting composition in order to assist in incorporating ingredients which may be too viscous to use easily as they are, to improve compatability between components of the composition or to render the compositions of the requisite viscosity to be spread easily by means of a trowel or other applicator. Such solvents must be inert to isocyanate groups and include esters, ketones, hydrocarbons and chlorinated hydrocarbons. Specific solvents which may be used include methyl ethyl ketone, methyl isobutyl ketone, 4-methyl-4-methoxypentan-2-one, ethyl acetate, butyl acetate, 2-ethoxyethyl acetate, cyclohexanone, toluene and xylene.

The proportions of the different ingredients used in the present compositions may be varied widely. Thus per 100 parts by weight of cement there may be used from 10 to 10,000 parts by weight of fine particle-size filler, from 10 to 75 parts by weight of water, from 5 to 5,000 parts by weight of urethane resin-forming components, defined as organic polyisocyanate plus isocyanate-reactive organic compound, and from 0 to 200 parts by weight of solvents. Preferred quantities are from 50 to 8000 parts of filler, 20–50 parts of water, 10 to 4000 parts of urethane resin and 0 – 100 parts of solvent.

After the grouting composition has been applied to the bonded fragments it must be allowed to harden sufficiently for surface-grinding to be carried out, although it is not essential to wait until curing is complete. It is convenient to allow the composition to harden overnight. The rather rough surface then obtained is ground flat and smooth using similar techniques to those employed for grinding and finishing conventional Terrazzo floors.

Although intended primarily for the surfacing of floors, the present process may also be employed for the surfacing of curved or inclined areas, providing that the grouting composition is sufficiently viscous to remain on such areas while hardening occurs. The bonded fragments which are first applied to the surface help to retain the grouting composition in position during the hardening process.

After the surfacing process is complete and the grinding stage has been carried out, there may be applied to the ground surface one or more coats of a urethane surface coating composition, which may be of the one-pack or two-pack type.

The invention is illustrated but not limited by the following Examples in which parts and percentages are by weight.

EXAMPLE 1

50 Parts of a polyisocyanate composition obtained by phosgenating crude diamino diphenylmethane containing amines of higher functionality and prepared by condensing formaldehyde and aniline in the presence of hydrochloric acid are mixed with 100 parts of a resin prepared by heating 320 parts of 1st Pressings Castor Oil with 80 parts of an esterified rosin-modified phenol/formaldehyde resol resin at 240°C. for 45 minutes. The latter ingredient is the glycerol ester of the product from the reaction between rosin and a diphenylolpropane/formaldehyde resol resin.

The polyisocyanate/resin mixture is spread on to a clean substrate and while still wet, mass-pigmented nylon polymer chips of approximately ¼ inch (0.635 cm) cross section are scattered on the surface. After allowing the urethane resin adhesive to dry a grouting composition was made up as described below and trowelled over the nylon chip-coated surface so as to fill all the gaps between the pieces of polymer.

The grouting composition was prepared as follows : 40 Parts of octyl epoxy stearate having an oxirane oxygen content of approximately 3.2%, 40 parts of white pigment paste consisting of 60 % titanium dioxide and 40 % of the same resin component used above in the formulation of the adhesive, 100 parts of Portland cement, 50, parts of micronised barytes and 40 parts of water are churned together until an even mixture is obtained, after which 50 parts of the same polyisocyanate composition used above in formulating the adhesive are added and mixed in until evenly dispersed.

After allowing 16 hours for the grouting composition to set, the mass is sanded smooth, so exposing the coloured polymer chips, the surface may then be left as it is or sealed by applying one, two or three coats of a one-pack or two-pack urethane lacquer as desired.

The completed composition is ready to take light traffic after 24 hours and may be fully used after 48 hours.

EXAMPLE 2

A polyvinyl acetate emulsion is spread onto a clean substrate and while still wet mass pigmented nylon chips of approximately ¼ inch (0.635 cm) cross section are scattered on the surface. After allowing the polyvinyl acetate adhesive to dry a grouting composition is made up as described below and trowelled over the nylon chip coated surface so as to fill in the gaps between the pieces of polymer.

The grouting composition is prepared as follows:

40 Parts of octyl epoxystearate having an oxirane oxygen content of approximately 3.2 %, 70 parts of white pigment paste consisting of 60 % of titanium dioxide and 40 % of the same resin as described in the "adhesive" in Example 1, 200 parts of Portland cement, 100 parts of micronised barytes, 30 parts of water, and 0.5 of a 10 % solution of dibutyl tin dilaurate in xylene are churned together, until an even mixture is obtained after which 50 parts of 3-isocyanatomethyl-3.5.5-trimethyl-cyclohexyl isocyanate are added and mixed in until evenly dispersed.

After allowing overnight to set the mass is sanded smooth so exposing the coloured polymer chips and the surface may then be left as it is or sealed by applying one, two or three coats of a one-or-two-pack urethane lacquer as desired.

The completed composition is ready to take light traffic in 24 hours and may be fully used after 48 hours.

What we claim is:

1. A process for the manufacture of decorative flooring surfaces which comprises bonding fragments of a polymeric material selected from the group consisting of nylon, polyethylene terephthalate, polyurethanes, urea/formaldehyde polymers, phenol/formaldehyde polymers and melamine/formaldehyde polymers to the floor to be surfaced, filling in the gaps between the bonded fragments with a grouting composition containing as essential ingredients a hydraulic cement, a fine particle size filler, water and an organic polyisocyanate, allowing the grouting composition to harden and then grinding or otherwise treating the hardened mass to expose the fragments of material and provide a smooth surface.

2. A process as claimed in claim 1 wherein the fragments of material have substantial size in all three dimensions.

3. A process as claimed in claim 1 wherein the fragments of material have a maximum dimension in the range 1.27 cm to 7.62 cm.

4. A process as claimed in claim 1 wherein the grouting composition contains in addition at least one isocyanate-reactive-organic compound.

5. A process as claimed in claim 4 wherein the isocyanate-reactive-organic compound is a dihydric or trihydric polyether having a molecular weight of from 100 to 1500.

6. A process as claimed in claim 4 wherein the isocyanate-reactive organic compound is the product obtained by heating caster oil with a rosinate of a metal selected from the group consisting of Group IIa of the Periodic Table or a condensation product of rosin with a material from the group consisting of i. at least one polyhydric alcohol,
ii. at least one polyhydric alcohol and at least one optionally subsituted phenol/formaldehyde resol resin and
iii. at least one polyhydric alcohol and at least one $\alpha, \beta$-unsaturated discarboxylic acid or the anhydride thereof.

7. A process as claimed in claim 1 wherein the grouting composition contains pigments, solvents inert to isocyanate groups an epoxidised oil.

8. A process as claimed in claim 1 wherein the grouting composition contains, per 100 parts by weight of hydraulic cement, 50 to 8000 parts of fine particle size filler, 20–50 parts of water, 10 to 4000 parts of urethane resin-forming components and 0–100 parts of solvent.

9. A process as claimed in claim 1 wherein the fragments are bonded to the floor to be surfaced by a natural or synthetic polymer having sufficient adhesiveness to bond the fragments to the floor.

* * * * *

UNITED STATES PATENT OFFICE
CERTIFICATE OF CORRECTION

Patent No. 3,772,051                    Dated November 13, 1973

Inventor(s) Herbert Jackson Shearing

It is certified that error appears in the above-identified patent and that said Letters Patent are hereby corrected as shown below:

In the heading, add the following:

--Foreign Application Priority Data

[30] August 14, 1970   Great Britain...39280/70--

Column 2, line 58, insert a comma between "trass" and "kieselguhr"

Column 3, line 13, "biuretes" should read --biurets-- line 35, "caster" should read --castor-- lines 53-54, "asbestive" should read --asbestine--

Column 5, line 11, after "50" delete the comma line 18, after "chips" change the comma to a period; and change "the" to --The--

Column 6, line 29, "easter" should read --castor-- line 42, "an epoxidised oil" should read --or an epoxidised oil--

Signed and sealed this 28th day of January 1975.

(SEAL)
Attest:

McCOY M. GIBSON JR.             C. MARSHALL DANN
Attesting Officer               Commissioner of Patents